(12) United States Patent  (10) Patent No.: US 8,620,024 B2
Huang et al.  (45) Date of Patent: Dec. 31, 2013

(54) SYSTEM AND METHOD FOR DYNAMIC GESTURE RECOGNITION USING GEOMETRIC CLASSIFICATION

(75) Inventors: Kuang-Man Huang, San Jose, CA (US); Ming-Chang Liu, San Jose, CA (US); Liangyin Yu, Fremont, CA (US)

(73) Assignee: Sony Corporation, Tokyo (JP)

( * ) Notice: Subject to any disclaimer, the term of this patent is extended or adjusted under 35 U.S.C. 154(b) by 756 days.

(21) Appl. No.: 12/885,104

(22) Filed: Sep. 17, 2010

(65) Prior Publication Data

US 2012/0068917 A1  Mar. 22, 2012

(51) Int. Cl.
G06K 9/00 (2006.01)

(52) U.S. Cl.
USPC .......................................... 382/103; 348/169

(58) Field of Classification Search
USPC ................ 382/100, 103, 106, 107, 162, 164, 382/170–172, 181, 190, 195, 199, 201, 206, 382/224; 348/169–172; 340/5.1, 5.2, 5.82, 340/5.83
See application file for complete search history.

(56) References Cited

U.S. PATENT DOCUMENTS

| | | | |
|---|---|---|---|
| 5,534,917 A | 7/1996 | MacDougall | |
| 5,594,469 A * | 1/1997 | Freeman et al. | 345/158 |
| 6,128,003 A | 10/2000 | Smith et al. | |
| 6,160,899 A * | 12/2000 | Lee et al. | 382/103 |
| 6,215,890 B1 * | 4/2001 | Matsuo et al. | 382/103 |
| 6,252,598 B1 * | 6/2001 | Segen | 715/863 |
| 7,046,232 B2 | 5/2006 | Inagaki et al. | |
| 7,519,223 B2 * | 4/2009 | Dehlin et al. | 382/203 |
| 8,165,344 B2 * | 4/2012 | Shirasaka | 382/103 |
| 8,254,627 B2 * | 8/2012 | Martin et al. | 382/103 |
| 8,290,210 B2 * | 10/2012 | Fahn et al. | 382/103 |
| 2003/0194131 A1 | 10/2003 | Zhao et al. | |
| 2008/0019589 A1 | 1/2008 | Yoon et al. | |
| 2008/0181459 A1 | 7/2008 | Martin et al. | |
| 2008/0244465 A1 | 10/2008 | Kongqiao et al. | |
| 2010/0053304 A1 * | 3/2010 | Underkoffler et al. | 348/42 |
| 2010/0060570 A1 * | 3/2010 | Underkoffler et al. | 345/156 |
| 2010/0060722 A1 | 3/2010 | Bell | |

OTHER PUBLICATIONS

United States Patent and Trademark Office (USPTO), International Search Report and Written Opinion issued Dec. 16, 2011 (with claims searched), related PCT Application No. PCT/US2011/045287, pp. 1-13.

Binh, N.D. et al.—"Real-Time Hand Tracking and Gesture Recognition System"—GVIP 05 Conf., Dec. 19-21, 2005, CICC, Cairo, Egypt. 7 pages.

Yoon, Ho-Sub et al.—"Hand gesture recognition using combined features of location, angle and velocity"—Abstract Only—Pattern Recognition, vol. 34, Issue 7, 2001, pp. 1491-1501.

* cited by examiner

*Primary Examiner* — Anand Bhatnagar
(74) *Attorney, Agent, or Firm* — John P. O'Banion (57) ABSTRACT

A gesture recognition system and method that inputs videos of a moving hand and outputs the recognized gesture states for the input sequence. In each image, the hand area is segmented from the background and used to estimate parameters of all five fingers. The system further classifies the hand image as one of the postures in the pre-defined database and applies a geometric classification algorithm to recognize the gesture. The system combines a skin color model with motion information to achieve real-time hand segmentation performance, and considers each dynamic gesture as a multi-dimensional volume and uses a geometric algorithm to classify each volume.

20 Claims, 11 Drawing Sheets

SYSTEM AND METHOD FOR DYNAMIC GESTURE RECOGNITION USING GEOMETRIC CLASSIFICATION

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to gesture recognition, and more particularly to gesture recognition for remote controls.

2. Description of Related Art

Gesture recognition is an emerging technology which can provide a more direct interaction method between human and machine. It is associated with spatial and temporal information and can be used to replace traditional control devices for future applications.

Gesture recognition systems have been attempted, e.g. U.S. Pat. No. 5,534,917. However, these systems generally involve complicated analysis that are computationally intensive and/or require costly hardware.

Accordingly, an object of the present invention is a gesture recognition system that is able to take input from a single HD camera and use a simple set of gestures with low computational complexity to minimize computational power. At least some of these objections will be met in the following description.

BRIEF SUMMARY OF THE INVENTION

System and methods are disclosed for real time recognition of hand gestures for remote control. The system uses a geometric classifier that quantizes each finger into a plurality of states, two for the thumb, and 3 for each finger.

The present invention takes videos of moving hand as input and ouputs the recognized gesture states for the input sequence. In each image, the hand area is segmented from the background and used to estimate parameters of all five fingers. The method further classifies the hand image as one of the postures in the pre-defined database and applies a geometric classification algorithm to recognize the gesture. The method 1) combines a skin color model with motion information to achieve real-time hand segmentation performance, and 2) considers each dynamic gesture as a multi-dimensional volume and uses a geometric algorithm to classify each volume. Potential application areas for the work include gesture recognition for computer/TV control and games.

The method combines a skin color model and motion to separate the hand area from the background. Then it extracts several parameters such as the hand size, the palm center, and the palm bottom and uses these parameters to classify the current finger states as "open" or "closed" or "half-open".

The systems and methods of the present invention do not use any expensive and/or special sensors. By using both skin color model and motion, the hand area is segmented from the background without depth map.

In one aspect of the invention, a gesture recognition system for remote control of a device comprises a sensor for capturing video data of a user's hand at a location near the device. The system includes a processor for processing the captured video data of the hand, and programming executable on the processor for carrying out the steps of: segmenting each hand image in the captured video based on skin color; extracting a parameter of the segmented hand image; the parameter relating to one of a plurality of fingers in the hand image; tracking the parameter in the hand image; quantizing the parameter for each of the plurality of fingers to a plurality of states by comparing the parameter against one or more thresholds; classifying a hand gesture based on the quantized states of the one or more fingers; and operating the device based on recognition of the hand gesture.

Another aspect is a method for remotely controlling a device using hand gestures, the device having a user interface for visualization on a display. The method includes the steps of capturing video of a user's hand with a sensor at a location near the device; segmenting each hand image in the captured video based on skin color; extracting a parameter of the segmented hand image; the parameter relating to one of a plurality of fingers in the hand image; tracking the parameter in the hand image; quantizing the parameter for each of the plurality of fingers to a plurality of states by comparing the parameter against one or more thresholds; classifying a hand gesture based on the quantized states of the one or more fingers; sending a command to the user interface based on recognition of the hand gesture and tracking of the one or more parameters; and outputting the sent command on the display to operate the device.

A further aspect is a gesture recognition system for remote control of a device having a user interface for visualization on a display. The system includes a sensor for capturing video data of a user's hand at a location near the device, and a processor for processing the captured video data of the hand. The system further includes programming executable on the processor for carrying out the steps of: segmenting each hand image in the captured video based on skin color; extracting a parameter of the segmented hand image; the parameter relating to one of a plurality of fingers in the hand image; tracking the parameter in the hand image; quantizing the parameter for each of the plurality of fingers to a maximum of three states by comparing the parameter against one or more thresholds; classifying a hand gesture based on the quantized states of the one or more fingers; and operating the device based on recognition of the hand gesture and tracking of a second parameter relating to the hand image; wherein operating the device comprises sending a command to the user interface based on recognition of the hand gesture and tracking of the second parameter.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only.

DETAILED DESCRIPTION OF THE INVENTION

Referring more specifically to the drawings, for illustrative purposes the present invention is embodied in the apparatus generally shown in FIG. 1 through FIG. 17. It will be appreciated that the apparatus may vary as to configuration and as to details of the parts, and that the method may vary as to the specific steps and sequence, without departing from the basic concepts as disclosed herein.

Figure 1:
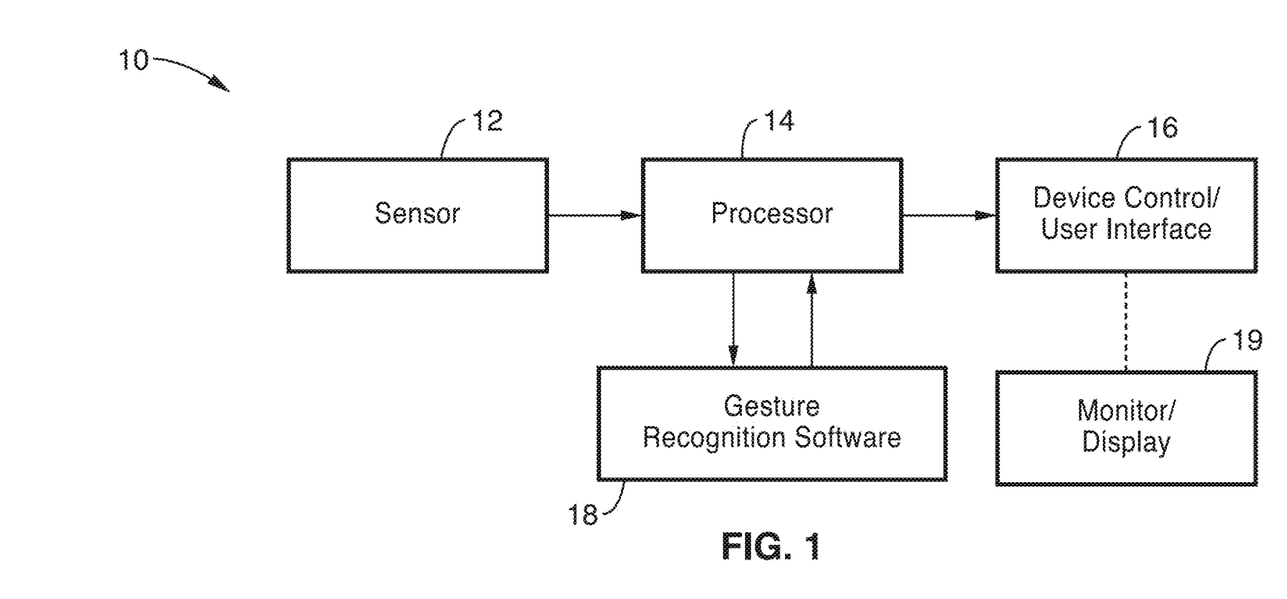
FIG. 1 is a schematic diagram of a gesture recognition system of the present invention.

FIG. 1 illustrates a schematic diagram of a gesture recognition system 10 of the present invention. The system 10 comprises a sensor 12 (e.g. HD format camera or the like), the output of which is coupled to processor 14 for receiving sensor input and operating gesture recognition software module 18. The gesture recognition module 18 analyzes the input from the sensor 12 and provides a command or operation that is sent to the device control application, or user interface software 16, which may be used to control volume, channel, programming, or other features of the device. It is appreciated that the device control application 16 may be configured to control a TV, set top box, computer, or other component.

Figure 2:
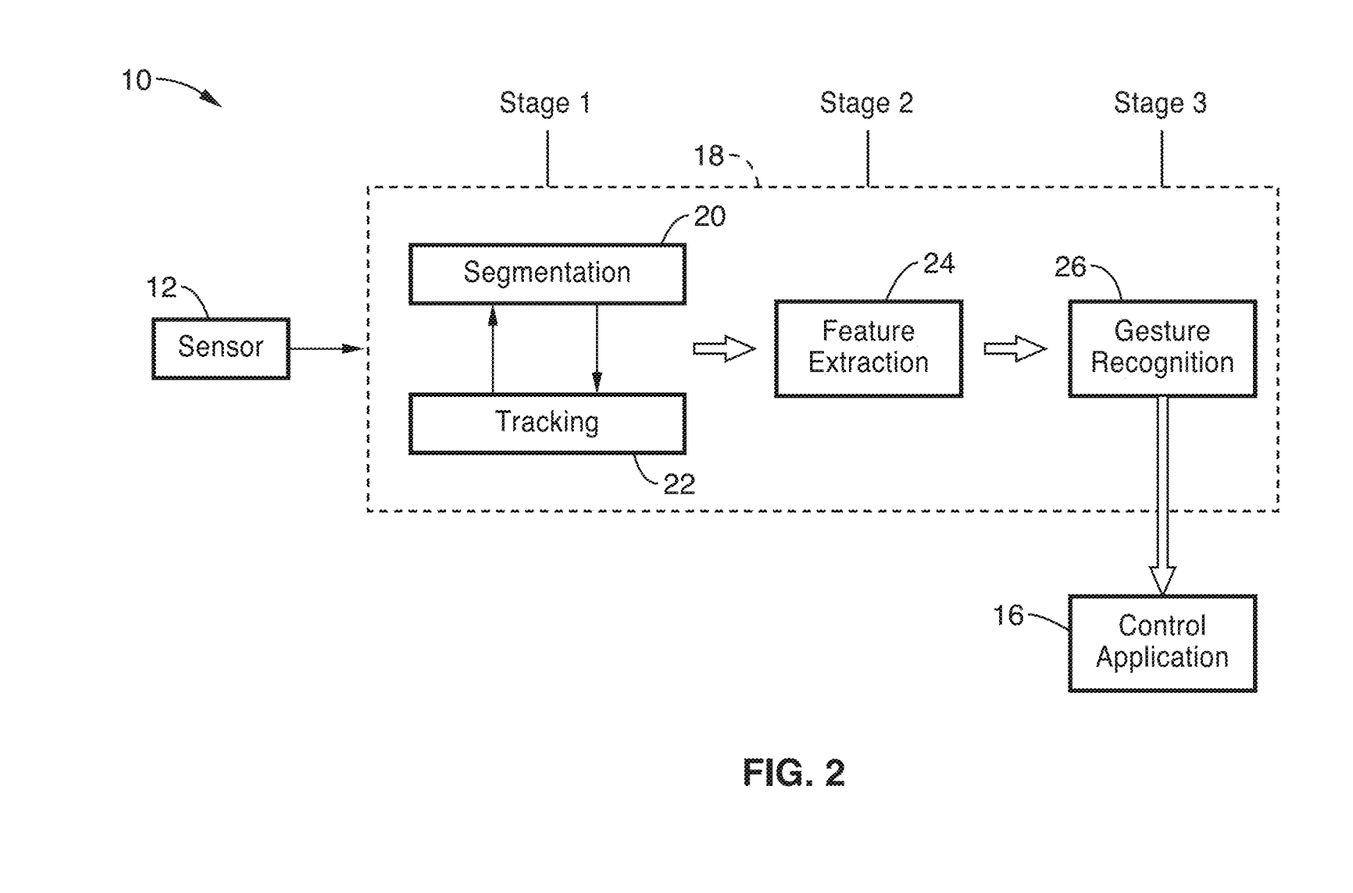
FIG. 2 illustrates a schematic diagram of the component overview of gesture recognition module of FIG. 1.

FIG. 2 illustrates the basic components of gesture recognition module 18 with respect to operation of system 10. The gesture recognition module 18 generally comprises three stages. In the first stage, the input or captured image from device 12 is processed at segmentation 20 and tracking 22 modules to segment the hand area from the background for tracking.

In the second stage, the system 10 performs a feature extraction module 24 to extract necessary features from detected hand areas.

In the third stage, the system 10 performs a gesture recognition module 26 by inputting the extracted features to a classifier for posture/gesture recognition. The result from gesture recognition module 26 is then output to the particular application 16 for control of the device.

Stage 1: Hand Segmentation

Image segmentation generally comprises assigning a label to the pixels in an image such that pixels with the same label share certain visual characteristics. The system 10 of the present invention preferably uses a skin color-based approach. This approach is based on the assumption that the skin tone is consistent (e.g. no significant change in values) within each individual image. This configuration separates chromatic components from intensity components to reduce sensitivity to light change. This approach allows for low computational complexity and real-time performance. In a preferred configuration, the input images from device 12 are in YCbCr 444 planar color format.

Figure 3:
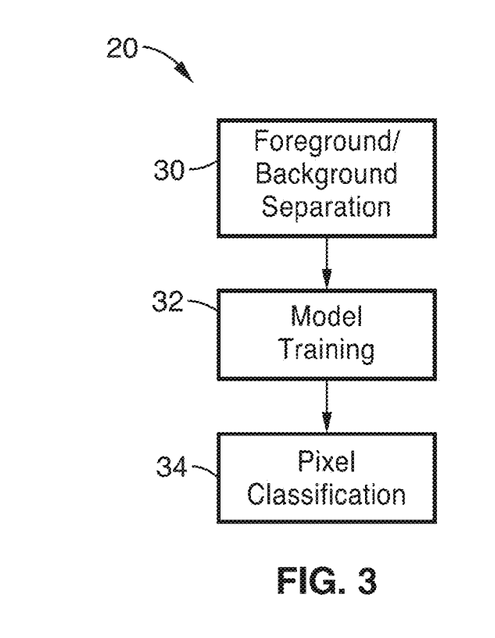
FIG. 3 is a schematic diagram of a segmentation module in accordance with the present invention.

As illustrated in FIG. 3, the segmentation module 20 generally comprises three steps: the first step 30 comprising foreground/background separation, the second step 32 comprising model training, and the third step 34 comprising pixel classification.

Figure 4:
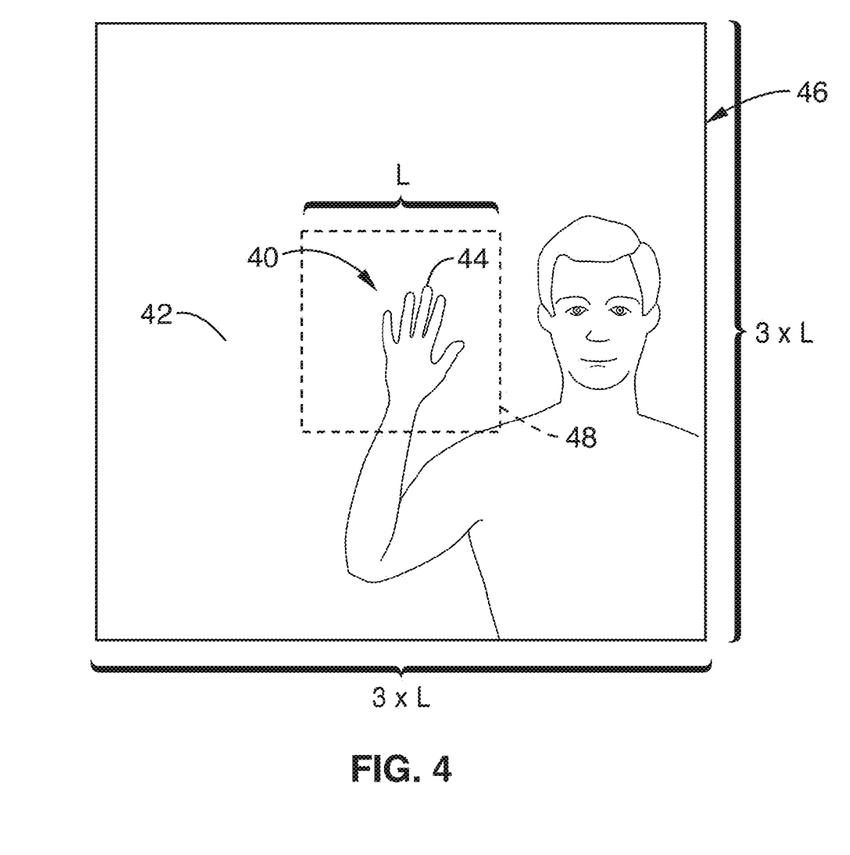
FIG. 4 is an illustration of a bounding box being applied to an image for foreground/background separation in accordance with the present invention.
Figure 5:
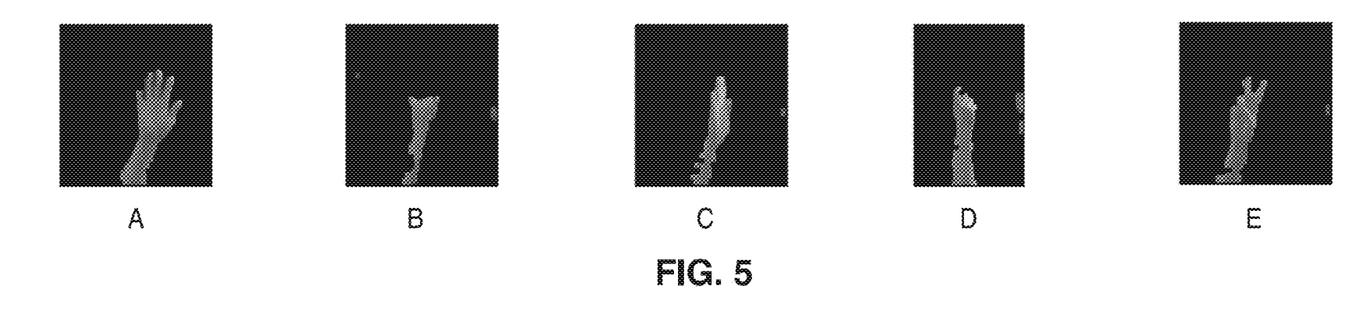
FIGS. 5A-5E illustrate images of successful hand segmentation results for different hand gestures according to the present invention.
Figure 6:
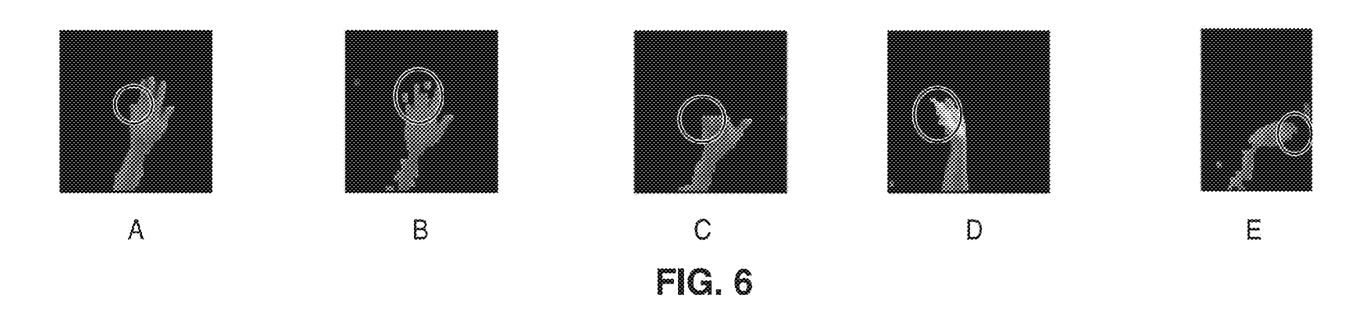
FIGS. 6A-E illustrate images of non-optimal hand segmentation.

FIG. 4 illustrates the foreground/background separation step 30, which detects the hand 44 position and size. A hand bounding box 48 is output after the hand 44 is detected. A triggering module (not shown) is preferably used to trigger the system 10 of the present invention to initiate (e.g. via the user raising hand 44). Bounding box 48 encloses the foreground area 40, and defines the background area 42 as the surrounding image enclosed in the outer box or search area 46. Here, the search area length is shown as 3× the bounding box 48 length L to cover movement of the hand 44. However, it is appreciated that other ratios may be applicable.

In the model training step 32, K-means clustering is preferably used to train a 3-component Gaussian mixture model for the image 40 inside the hand bounding box 48 (preferably only the Cb, Cr color channels are used). K-means is also used to train a 3-component Gaussian mixture model for the image within the background area 42 (only Cb, Cr color channels). Although is possible to use other (e.g. histogram-based) methods K-means is preferred, as other methods are generally slower and more computationally intensive.

The K-means algorithm is an iterative technique that is used to partition the image into K clusters. The K-means algorithm generally comprises 1) picking K cluster centers, either randomly or based on some heuristic, 2) assigning each pixel in the image to the cluster that minimizes the distance between the pixel and the cluster center, 3) re-computing the cluster centers by averaging all of the pixels in the cluster, and 4) repeating steps 2 and 3 until convergence is attained (e.g. no pixels change clusters). Generally, the distance is the squared or absolute difference between a pixel and a cluster center. The difference may be based on pixel color, intensity, texture, and location, or a weighted combination of these factors.

The system 10 of the present invention preferably uses a skin color-based approach. This approach is based on the assumption that the skin tone is consistent (e.g. no significant change in values) within each individual image. This configuration is sensitive to light change and may be improved by separating chromatic components from intensity components. This approach allows for low computational complexity and real-time performance. In a preferred configuration, the input images from device 12 are in YCbCr 444 planar color format.

To refine the foreground 40 color model, all components which are not within the range of the general skin model ($77 \leq Cb \leq 127$, $133 \leq Cr \leq 173$) are eliminated.

If three components are all within (or all not within) the skin model range, we determine the component from the foreground Gaussian model which is the closest to any of the background components, and then eliminate it. The rest of the components are then used to represent the foreground area 40.

The pixel classification step 34 is preferably performed using GMM and Bayesian decision rule. For each current hand image, we use the same part of the previous image as the reference. Pixels satisfying either one of the following criteria (Equations 1 & 2 for motion, and Equation 3 for skin color) are considered as hand pixels (otherwise the pixels are classified as background pixels):

1. Motion and Skin-Color:

$$|Cb(x,y)-Cb_{ref}(x,y)|>5 \text{ or } |Cr(x,y)-Cr_{ref}(x,y)|>5 \qquad \text{Eq. 1}$$

and $$2*P_{hand} \times P(c|\text{hand}) > (1-P_{hand}) \times P(c|\text{background}) \qquad \text{Eq. 2}$$

2. Skin-Color:

$$P_{hand} \times P(c|\text{hand}) > (1-P_{hand}) \times P(c|\text{background}) \qquad \text{Eq. 3}$$

The pixel classification step 34 is preferably then followed by morphological dilating and eroding operators to refine the obtained binary hand mask The probabilities in pixel classification step 34 are computed using Equation 4, 5 and 6 as follows:

$$P(c|\text{hand}) = \sum_{k=1}^{K} p_k g_{hand}(c; \mu_k, \sigma_k) \qquad \text{Eq. 4}$$

where $P_{hand}$ is the ratio of the previous hand area to the background area 42, $P(c|\text{hand})$ is the probability of a pixel c belonging to the foreground (hand) area 40, $g_{hand}$ is the probability of a pixel c belonging to the k-th component of the foreground Gaussian mixture model, and $p_k$ is the prior probability of the k-th component ($p_k$, the mean $\mu_k$, and the covariance matrix $\sigma_k$ are trained in model training step 32).

$$P(c|\text{background}) = \sum_{k=1}^{K} p_k g_{background}(c; \mu_k, \sigma_k) \qquad \text{Eq. 5}$$

where $P(c|\text{background})$ is the probability of a pixel c belonging to the background area, $g_{background}$ is the probability of a pixel c belonging to the k-th component of the background Gaussian mixture model, $p_k$ is the prior probability of the k-th component. ($p_k$, the mean $\mu_k$, and the covariance matrix $\sigma_k$ are trained in model training step 32).

The probability of a pixel c belonging to a GMM component is computed using Equation 6:

$$g(c; \mu_k, \sigma_k) = \frac{1}{\left(\sqrt{2\pi}\,\sigma_k\right)^2} e^{-\frac{1}{2}\left(\frac{\|c-\mu_k\|}{\sigma_k}\right)^2} \qquad \text{Eq. 6}$$

FIGS. 5A-5E illustrate successful hand segmentation results for different hand gestures according to the present invention. Correspondingly, the images in FIGS. 6A-E illustrate non-optimal hand segmentation wherein images of certain gestures have partial features, missing, incorrect, and/or discontinuous anatomy, as shown in the encircled areas.

The tracking step 22 tracks the palm center from the segmented image as the observation point. The palm center is obtained using an image-based method described in detail below.

The tracking step uses a Kalman filter for the prediction and computation of the actual hand position and speed for the next frame (based on the observation from the current frame).

An exemplary Kalman filter using low computation is shown in Equations 7 and 8:

$$X_k = F_k X_{k-1} + B_k U_k + W_k \qquad \text{Eq. 7}$$

where $F_k$ is the state transition model which is applied to the previous state $X_{k-1}$, $B_k$ is the control-input model which is applied to the control vector $U_k$, $W_k$ is the process noise which is assumed to be drawn from a zero mean multivariate normal distribution with covariance $Q_k$.

$$Z_k = H_k X_k + V_k, V_k \sim N(o, R_k) \qquad \text{Eq. 8}$$

where $H_k$ is the observation model which maps the true state space into the observed space and $V_k$ is the observation noise which is assumed to be zero mean Gaussian white noise with covariance $R_k$.

The hand position in each image (e.g. 2-D location of the palm center) is then output and saved as a part of the output structure.

Stage 2: Feature Extraction

FIGS. 7-14B illustrate the second stage operations of the feature extraction module 24.

Figure 7:
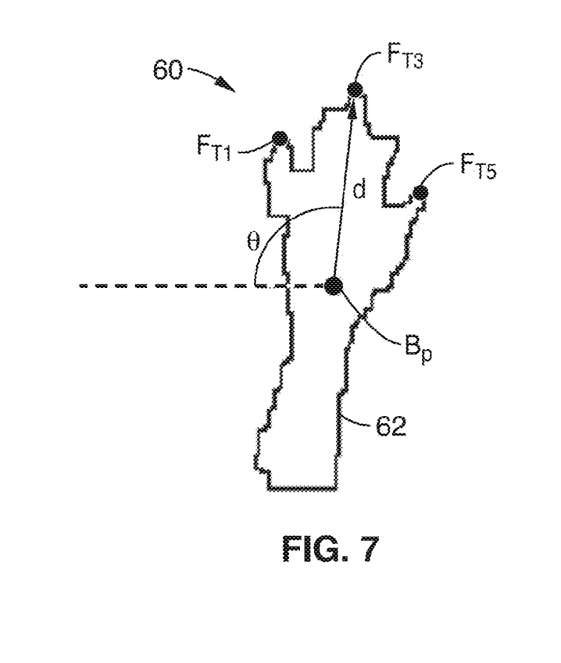
FIG. 7 illustrates a binary hand mask and calculated parameters for a segmented image frame in accordance with the present invention.

The first step in the feature extraction is finger direction estimation, to locate finger-positions (represented by directions) from the segmented image. FIG. 7 illustrates a binary hand mask 60 for each segmented image frame. Hand mask 60 comprises the extracted contour 62 generated from the difference between the original mask and the eroded mask (not shown). The eroded mask is obtained by an eroding algorithm typically available in the art that thins the original mask by one pixel.

Finger directions are described by using two parameters: $\theta$, which is the angle between the horizontal line and the vector between the finger point $F_{T1-4}$ (e.g. $F_{T3}$ for middle finger), and the palm bottom $B_p$.

Figure 8:
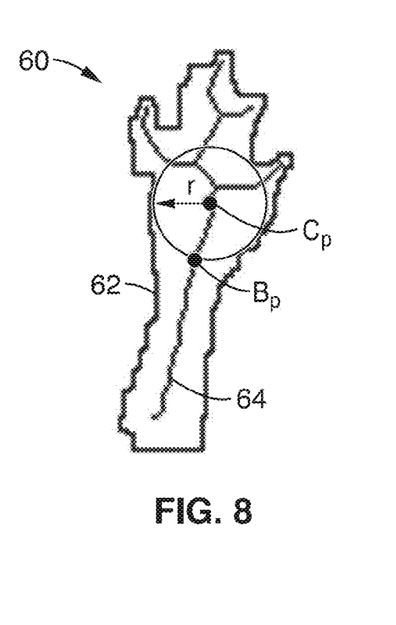
FIG. 8 illustrates the mask of FIG. 7 evaluated to find center-contour distance.

Referring to FIG. 8, skeleton 64 is generated from a morphological thinning algorithm, which converts binary shapes obtained from the contour 62 to 1-pixel wide lines. The method may comprise any thinning algorithm generally known in the art, but generally involves iteratively deleting pixels inside the contour shape 62 to shrink it without shortening it or breaking it apart.

The extracted contour 62 is then analyzed with respect to the skeleton 64 to obtain the palm center $C_p$, which is defined and calculated as the point on the skeleton 64 that is at the largest distance r from the hand contour.

The palm bottom $B_p$ is then calculated as the point on skeleton 64 which is r pixels from (below) the palm center $C_p$.

Figure 9:
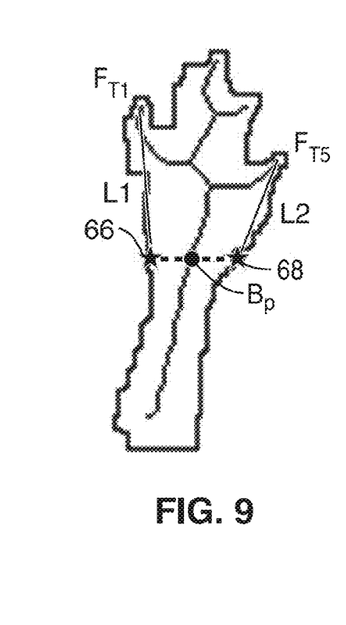
FIG. 9 illustrates the mask of FIG. 7 evaluated to find the outlines of the palm.

Two outlines L1 and L2 are generated as lines from the two contour points 66, 68 having the same y position as palm bottom $B_p$, to two upper contour points defined as $F_{T1}$ and $F_{T5}$.

Figure 10:
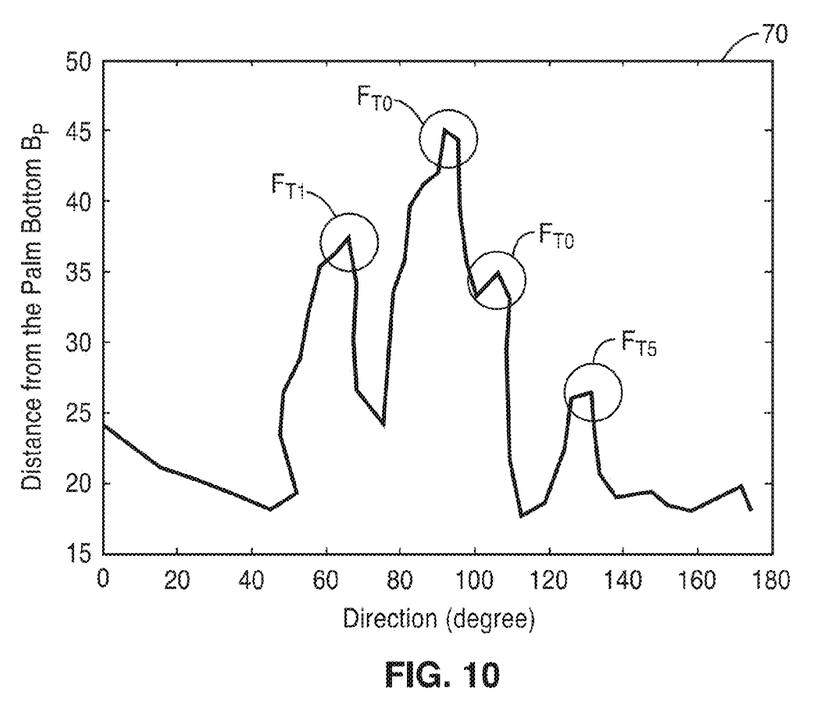
FIG. 10 illustrates a graph of the computed distance from palm bottom with respect to angle.

Referring to FIG. 10, the distance between the palm bottom $B_p$ and each contour point above the palm bottom $B_p$ are measured. Two local maxima with θ close to directions of the two outlines L1, L2 (e.g. difference <10°) are found, and then defined as pinky finger (e.g. $F_{T1}$) and thumb directions (e.g. $F_{T5}$). If no appropriate candidate is found, outline directions L1 and L2 may be used to represent picky finger and thumb directions.

After pinky finger (e.g. $F_{T1}$) and thumb directions (e.g. $F_{T5}$) are known, we search for other local maxima in between (e.g. $F_{T0}$). After some local maxima (fingers) are detected directly, the method determines if there is any missing finger, and which fingers are missing.

The direction and identification of missing fingers can be estimated by being compared to a reference. A calibration step is used to generate an initial reference (that will be updated during the process). The first ten images are used to calibrate from the input image sequence, which always starts with open hand postures (with fingers separated). The average direction for all 5 fingers is detected (using previously described method) from the open hand postures and then used for initial reference. The following two parameters are also computed from the first ten images:

Threshold1: 1.5R, where R is average palm radius R=ave (r)

Threshold2: ave(1.5R+$d_i$)/2, where $d_i$ is the distance from each finger tip i (except the thumb) to the palm bottom $B_p$.

Figure 11:
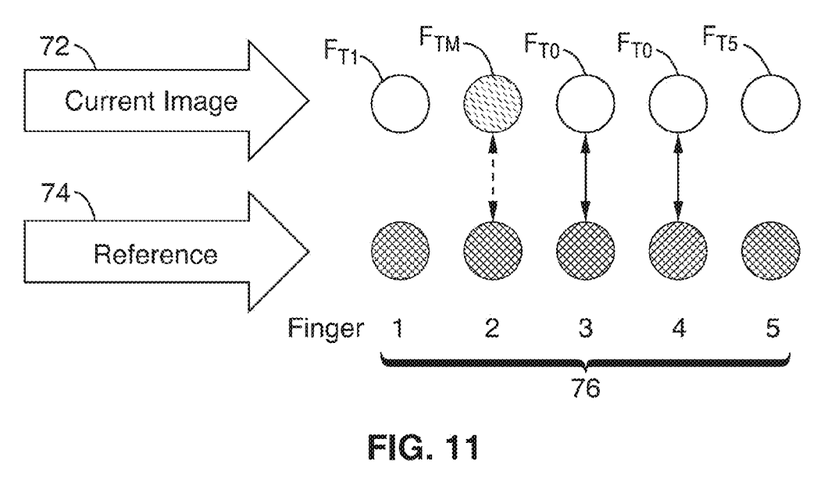
FIG. 11 shows a schematic diagram of a reference image compared to the current image to find a missing finger.

Referring to FIG. 11, biological factors are used to find missing fingers via constraining the angle between directions of index finger and pinky finger is equal or less than 75°. If the angle between each pair of detected fingers is larger than 25°, it is assumed that there is a missing finger in between, and it is assumed that there are two missing fingers if the angle is larger than 50°.

After assumptions based on the biological constraints, all finger directions of the current image 72 are estimated by comparing the assumptions to the fingers 76 of reference 74. As shown in FIG. 11 missing finger $F_{TM}$ is inserted between pinky finger $F_{T1}$ and Middle finger $F_{T0}$.

If any detected finger direction $D_i$ matches the a finger i in the reference (the difference is less than 10°), the detected direction $D_i$ is used to update the reference using an alpha model:

$$D_{new\_ref,i} = 0.5 \times D_{old\_ref,i} + 0.5 \times D_i$$

Directions of missing fingers are represented by the directions of the corresponding fingers in the reference 74. After directions of five fingers are decided, the compute distances $d_i$ from the palm bottom $B_p$ to finger tips ($F_{T1}$, $F_{T2}$, $F_{T3}$, $F_{T4}$) (except the thumb).

Figure 12:
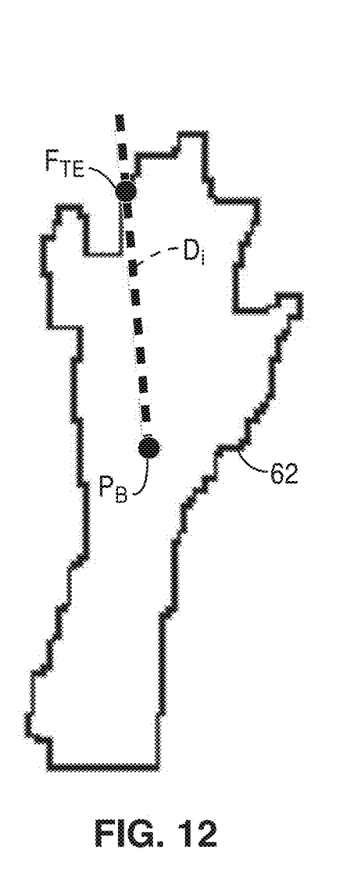
FIG. 12 shows a hand contour being analyzed to determine an estimated finger direction.
Figure 13:
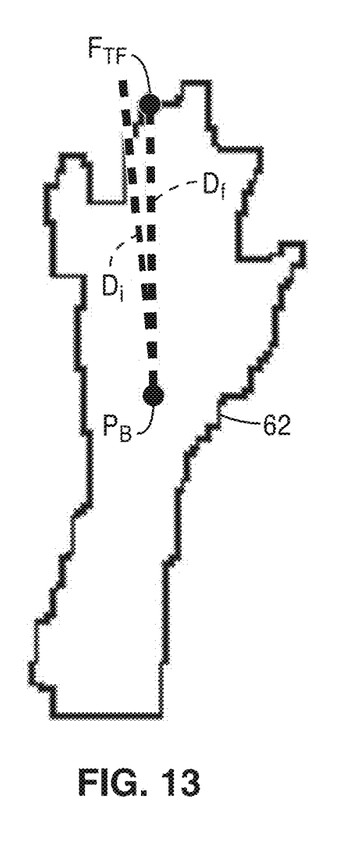
FIG. 13 shows a hand contour being analyzed to determine a refined finger direction.

After the finger direction estimation using reference 74, each finger direction is further refined using hand contour, as shown in FIGS. 12 and 13. For an estimated finger direction $D_i$, the contour pixel $F_{TF}$ that has the largest distance from the palm bottom $B_p$ is calculated (within a range of $D_i$±10°). The found fingertip pixel $F_{TF}$ is then used to compute the final finger direction $D_f$ and distance from the palm bottom $B_p$.

For each current image, the finger tip-palm bottom distances di are compared to two previously calculated thresholds to quantize the finger states:

If $d_i$<threshold1: state 0 (close)

If threshold1<$d_i$<threshold2: state 1 (half open)

If $d_i$>threshold2: state 2 (open)

The thumb only has two states (open and close). If an obvious thumb tip (local maximum) is detected, then the state is "open 1" (otherwise, it's "close 0").

Figure 14A:
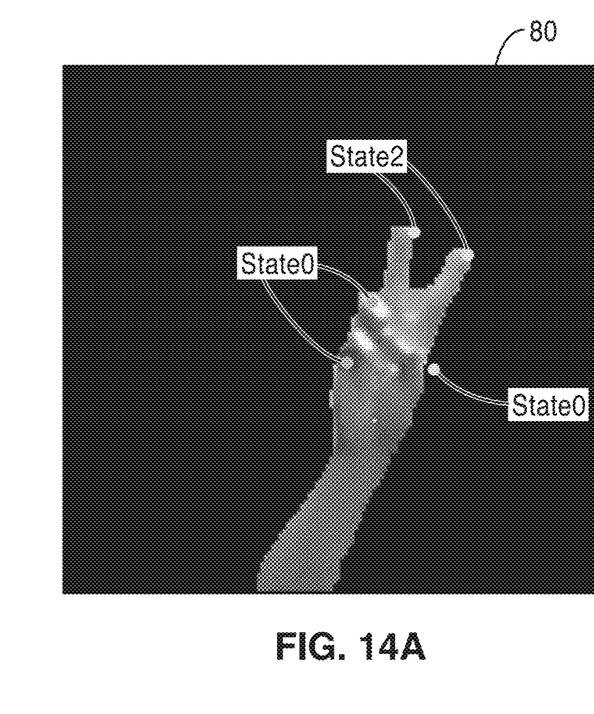
FIGS. 14A and 14B show examples of quantized finger states.
Figure 14B:
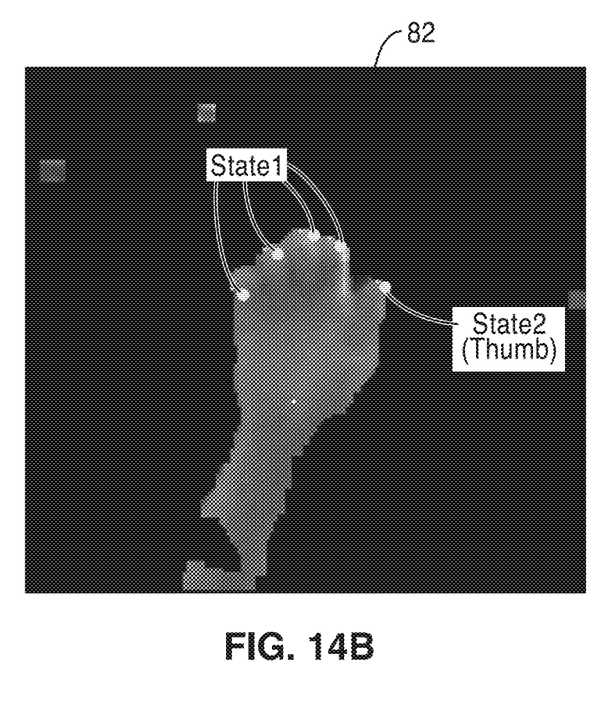

FIGS. 14A and 14B illustrate quantized finger state examples for two different hand postures. In the posture of FIG. 14A, only the index and middle finger are "open" (state 2: $d_i$>threshold2). All other fingers are "closed" (state 0: $d_i$<threshold1). In the posture of FIG. 14B, only the thumb is "open" (state 2: $d_i$>threshold2). All other fingers are "half open" (state 1: threshold1<$d_i$<threshold2).

Stage 3: Gesture Recognition

In the third stage, each posture is classified. After the finger states are decided, self-defined bending angles (total bending angle from all joints in each finger) are assigned to different states:

Thumb: state 0 (180°), state 1 (0°)

Other fingers: state 0 (225°), state 1 (135°), state 2 (0°)

A median filter (window size: 5) (along time axis) is applied to obtain a more smoothed finger state sequence. For each image frame, if the finger states are completely equal to the previous frame and the next frame, its finger states is outputted as key postures.

Next, the Euclidean distances (in bending angle fashion) between each current posture and all postures in the database are computed, and the one with the least distance is used as the posture classification result.

Figure 15:
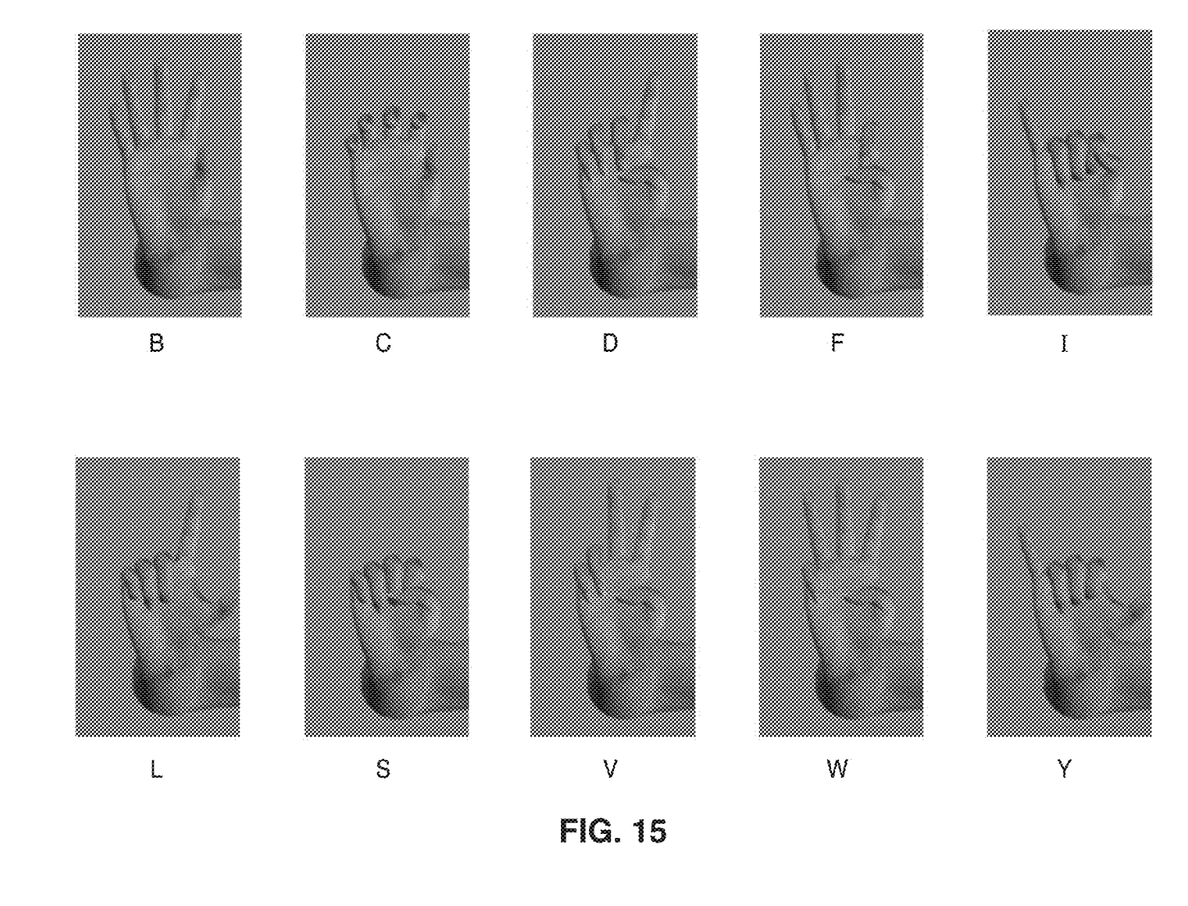
FIG. 15 illustrates images of a predefined posture database of ten postures.

FIG. 15 illustrates a pre-defined posture database (each test video is composed of these 10 postures).

For verification, Table 1 shows results of a manual check of all output finger states compared to ground truth video to see if the key postures were correctly classified using the system and methods of the present invention.

Figure 16:
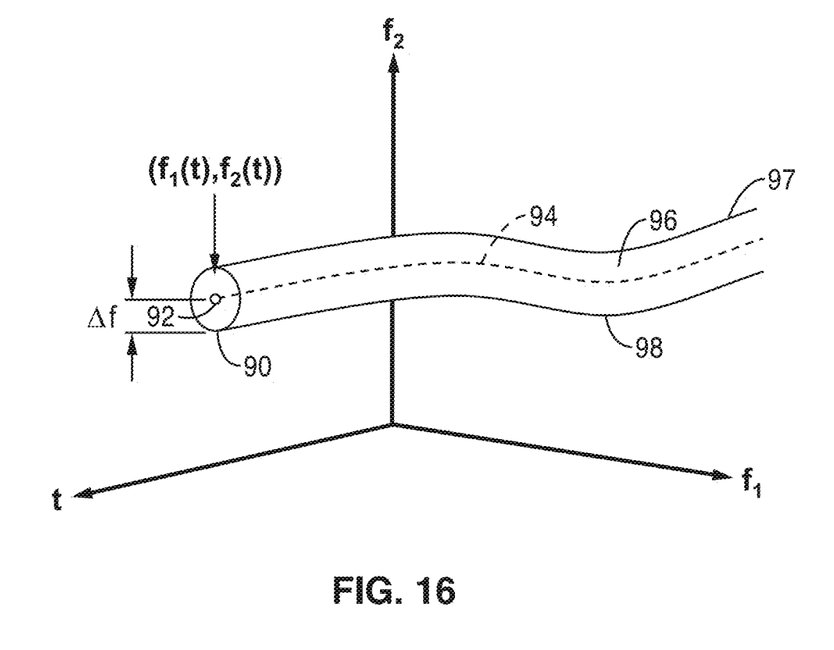
FIG. 16 illustrates the geometric classifier in accordance with the present invention.

The geometric classifier of the present invention is illustrated in FIG. 16

Each gesture is composed of multiple postures (from the posture database, e.g. FIG. 15). Each gesture is represented by using 6-dimensional volume 94 (no translation, rotation involved): composed of 6 dimensions $f_1$, $f_2$, $f_3$, $f_4$, $f_5$, and t (where $f_j$ is the sum of all joint bending angles within each finger j after quantization).

Thumb: $f_1$={0, 180°}

Other fingers: $f_j$={0, 135°, 225°}, where j=2, 3, 4, 5

Δf is the bending angle noise

The volume 96 comprises swath of the area defined by radius Δf from point 92 along line 94 (e.g. defined by $f_1$(t), $f_2$(t))

To evaluate the geometric classifier, a test gesture curve was generated. A set of key postures were chosen from the pre-defined posture space (with known joint parameters). The interval between each pair of key postures is: 0.5 sec+$N_t$, where $N_t$ is Gaussian noise with mean 0 and standard deviation value 0.125 sec. Noise $N_j$ was added to the bending angle to each joint degree of freedom (DOF), where $N_j$ is Gaussian noise with mean 0 and standard deviation value 20° (the sum of bending angles for each finger is greater than 0). Next, the generated data is interpolated to have 50 points (which are saved for rendering). An integer M is random between 12.5 (25%) and 37.5 (75%) and remove M points (randomly chosen) from the interpolated data Referring now to FIG. 17, a standard gesture volume 98 is generated. A set of key postures are chosen from the pre-defined posture space (with known joint parameters). The interval between each pair of key postures is fixed to be 0.5 sec, and the data is interpolated to have 50 points Given a standard gesture, each data point $(f_{1,test}(t_1), f_{2,test}(t_1), f_{3,test}(t_1), f_{4,test}(t_1), f_{5,test}(t_1))$ in each test gesture curve is examined whether it's contained by the standard gesture volume 98:

$$\text{criterion} \rightarrow \text{distanced}(t_1, t_2) = \left( \sum_{i=1}^{5} |f_{i,test}(t_1) - f_{i,standard}(t_2)|^2 \right)^{1/2} < \Delta f$$

where $|t_1 - t_2| < \Delta t$.

Figure 17:
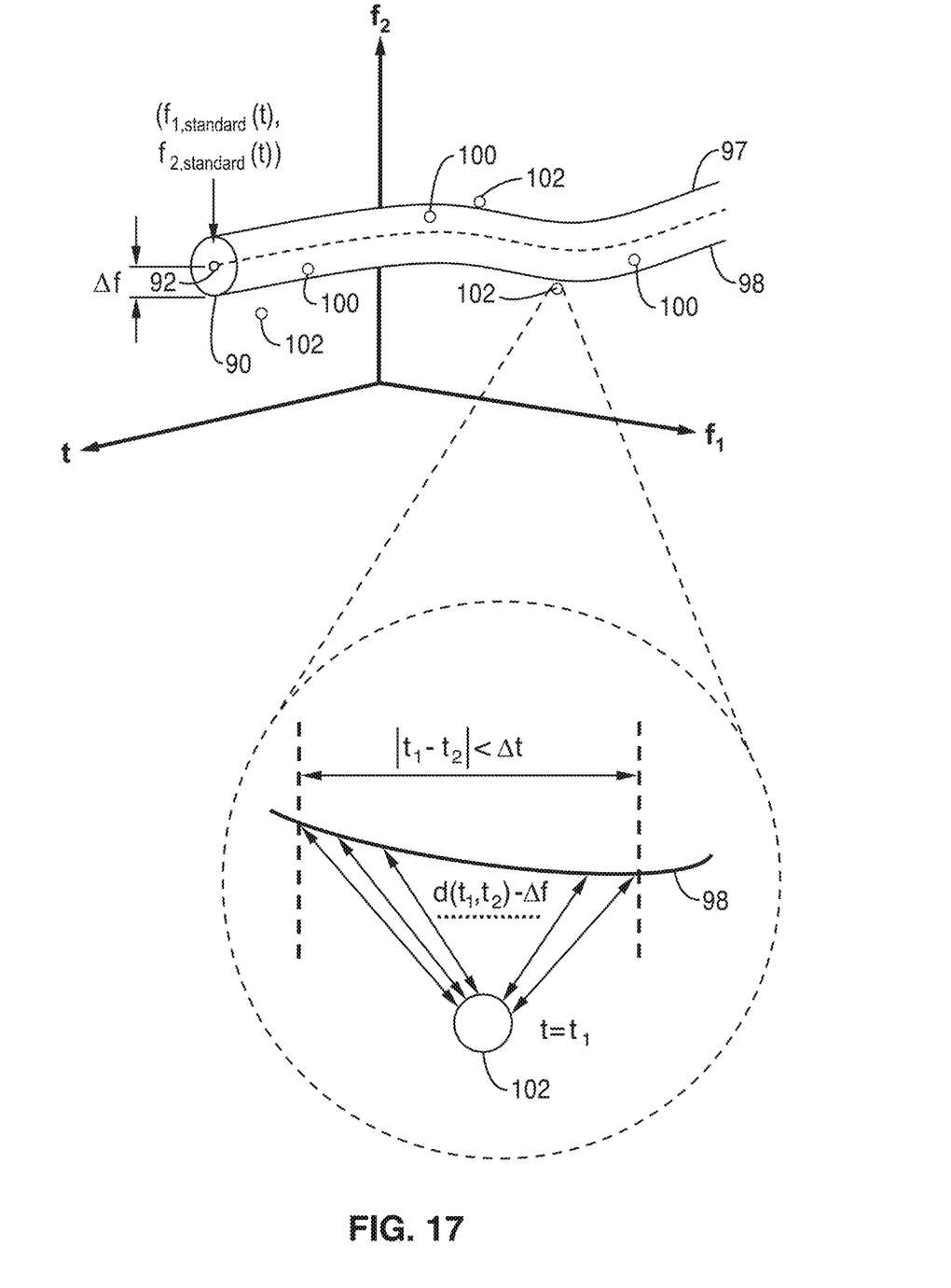
FIG. 17 illustrates an evaluation of the geometric classifier of the present invention.

If the data point is contained by the standard volume (e.g. points 100), it is given a weight $w(t_1) = 1$.

If the data point is not contained by the standard volume (e.g. points 102), it is given a weight in the following form:

$$w(t_1) = \max_{t_2} \exp\left( \frac{-(d(t_1,t_2) - \Delta f)^2}{2\sigma^2} \right)$$

where $|t_1 - t_2| < \Delta t$.

The total weight (corresponding to each standard gesture) is computed and the standard gesture with the maximum weight is chosen to be the category of the test gesture The training data contained 10 gestures (5 with 3 key postures and 5 with 4 key postures). Based on the experiment using self-generated gestures, the classifier worked with 100% correction percentage.

High-dimensional space increases the complexity and also the accuracy (gestures are more separated with more dimensions). The experiment is based on the assumption that we can obtain finger-states (with accuracy at a certain level), which requires good segmentation algorithm for extracting precise hand contours.

The system and method of the present invention use skin-color and motion based model to achieve real-time segmentation, and approximates finger positions based from extracted hand mask and contour. The finger states are quantized and key postures are determined by comparing all postures to a pre-established posture database. A geometric method is used to classify the hand gestures.

Embodiments of the present invention are described with reference to flowchart illustrations of methods and systems according to embodiments of the invention. These methods and systems can also be implemented as computer program products. In this regard, each block or step of a flowchart, and combinations of blocks (and/or steps) in a flowchart, can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts support combinations of means for performing the specified functions, combinations of steps for performing the specified functions, and computer program instructions, such as embodied in computer-readable program code logic means, for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s).

As can be seen, therefore, the present invention includes the following inventive embodiments among others:

1. A gesture recognition system for remote control of a device, comprising: a sensor for capturing video data of a user's hand at a location near said device; a processor for processing the captured video data of said hand; programming executable on said processor for carrying out the steps of: segmenting each hand image in the captured video based on skin color; extracting a parameter of the segmented hand image; said parameter relating to one of a plurality of fingers in the hand image; tracking the parameter in the hand image; quantizing the parameter for each of the plurality of fingers to a plurality of states by comparing the parameter against one or more thresholds; classifying a hand gesture based on the quantized states of the one or more fingers; and operating the device based on recognition of said hand gesture.

2. A system as recited in embodiment 1, wherein segmenting each hand image comprises: separating a foreground area associated with said hand from a background area surround said foreground area, training a 3-component mixture model of the background area and foreground area; and classifying the image pixels based on one or more of motion and skin color.

3. A system as recited in embodiment 1, wherein the image is segmented using only Cb and Cr color channels.

4. A system as recited in embodiment 1, wherein extracting one or more parameters comprises: obtaining a palm center location of the user's hand based on an extracted contour and skeleton of the hand.

5. A system as recited in embodiment 4, wherein tracking the at least one of the one or more parameters comprises tracking the palm center location using a Kalman filter.

6. A system as recited in embodiment 1, wherein the parameter is quantized to a maximum of three states.

7. A system as recited in embodiment 6, wherein the hand image further comprises a thumb four fingers; wherein a parameter corresponding to the thumb is quantized to two states; and wherein a parameter corresponding to each of the four fingers is quantized to three states.

8. A system as recited in embodiment 4, wherein extracting the parameter further comprises: obtaining a palm bottom location; approximating a location of a fingertip of at least one of the plurality of fingers based on said contour; and measuring the distance between the palm bottom location and each of the approximated fingertip locations.

9. A system as recited in embodiment 8, wherein quantizing the parameter to a plurality of states comprises: comparing the measured distance for each finger to first and second threshold values; classifying a finger as being in a first state if the measured distance for the finger is below the first threshold value; classifying the finger as being in a third state if the measured distance for the finger is above the second threshold value; and classifying the finger as being in a second state if the measured distance for the finger is between the first threshold value and the second threshold value.

10. A system as recited in embodiment 9, wherein the first state comprises a "closed" hand gesture, the second state comprises a "half-open" hand gesture, and the third state comprises an "open" hand gesture.

11. A system as recited in embodiment 10, wherein classifying a hand gesture comprises comparing the quantized states against a database of predetermined hand gestures.

12. A method for remotely controlling a device using hand gestures, the device having a user interface for visualization on a display, comprising: capturing video of a user's hand with a sensor at a location near said device; segmenting each hand image in the captured video based on skin color; extracting a parameter of the segmented hand image; said parameter relating to one of a plurality of fingers in the hand image; tracking the parameter in the hand image; quantizing the parameter for each of the plurality of fingers to a plurality of states by comparing the parameter against one or more thresholds; classifying a hand gesture based on the quantized states of the one or more fingers; sending a command to the user interface based on recognition of said hand gesture and tracking of said one or more parameters; and outputting the sent command on the display to operate the device.

13. A method as recited in embodiment 12, wherein the parameter is quantized to a maximum of three states.

14. A method as recited in embodiment 13, wherein the hand image further comprises a thumb four fingers; wherein a parameter corresponding to the thumb is quantized to two states; and wherein a parameter corresponding to each of the four fingers is quantized to three states.

15. A method as recited in embodiment 14, wherein extracting the parameter comprises: obtaining a palm bottom location; approximating a location of a fingertip of at least one of the plurality of fingers based on said contour; and measuring the distance between the palm bottom location and each of the approximated fingertip locations.

16. A method as recited in embodiment 15, wherein quantizing the parameter to a plurality of states comprises: comparing the measured distance for each finger to first and second threshold values; classifying a finger as being in a first state if the measured distance for the finger is below the first threshold value; classifying the finger as being in a third state if the measured distance for the finger is above the second threshold value; and classifying the finger as being in a second state if the measured distance for the finger is between the first threshold value and the second threshold value.

17. A method as recited in embodiment 16, wherein the first state comprises a "closed" hand gesture, the second state comprises a "half-open" hand gesture, and the third state comprises an "open" hand gesture.

18. A method as recited in embodiment 12, wherein classifying a hand gesture comprises comparing the quantized states against a database of predetermined hand gestures.

19. A gesture recognition system for remote control of a device having a user interface for visualization on a display, comprising: a sensor for capturing video data of a user's hand at a location near said device; a processor for processing the captured video data of said hand; programming executable on said processor for carrying out the steps of: segmenting each hand image in the captured video based on skin color; extracting a parameter of the segmented hand image; said parameter relating to one of a plurality of fingers in the hand image; tracking the parameter in the hand image; quantizing the parameter for each of the plurality of fingers to a maximum of three states by comparing the parameter against one or more thresholds; classifying a hand gesture based on the quantized states of the one or more fingers; and operating the device based on recognition of said hand gesture and tracking of a second parameter relating to said hand image; wherein operating the device comprises sending a command to the user interface based on recognition of said hand gesture and tracking of said second parameter.

20. A system as recited in embodiment 19, wherein extracting the parameter comprises: obtaining a palm bottom location; approximating a location of a fingertip of at least one of the plurality of fingers based on said contour; and measuring the distance between the palm bottom location and each of the approximated fingertip locations.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

TABLE 1

| File name | # of output postures (total) | # of correctly classified postures | Success rate |
| --- | --- | --- | --- |
| Hand_Andy2 | 39 (115) | 37 | 94.9% |
| Hand_Andy7 | 146 (282) | 136 | 93.2% |
| Hand_Andy8 | 219 (287) | 192 | 87.7% |
| Hand_Quan1 | 87 (160) | 82 | 94.3% |
| Hand_Quan4 | 60 (219) | 56 | 93.3% |

What is claimed is:

1. A gesture recognition system for remote control of a device, comprising:
   (a) a sensor for capturing video data of a user's hand at a location near said device;
   (b) a processor for processing the captured video data of said hand; and
   (c) programming executable on said processor for performing steps comprising:

segmenting each hand image in the captured video based on skin color;

extracting a parameter of the segmented hand image;

said parameter relating to one of a plurality of fingers in the hand image;

tracking the parameter in the hand image;

quantizing the parameter for each of the plurality of fingers to a plurality of states by comparing the parameter against one or more thresholds;

classifying a hand gesture based on the quantized states of the one or more fingers; and operating the device based on recognition of said hand gesture.

2. A system as recited in claim 1, wherein segmenting each hand image comprises:

separating a foreground area associated with said hand from a background area surrounding said foreground area;

training a 3-component mixture model of the background area and foreground area; and classifying the image pixels based on one or more of motion and skin color.

3. A system as recited in claim 1, wherein the image is segmented using only Cb and Cr color channels.

4. A system as recited in claim 1, wherein extracting one or more parameters comprises:

obtaining a palm center location of the user's hand based on an extracted contour and skeleton of the hand.

5. A system as recited in claim 4, wherein tracking the at least one of the one or more parameters comprises tracking the palm center location using a Kalman filter.

6. A system as recited in claim 4, wherein extracting the parameter further comprises:

obtaining a palm bottom location;

approximating a location of a fingertip of at least one of the plurality of fingers based on said contour; and measuring the distance between the palm bottom location and each of the approximated fingertip locations.

7. A system as recited in claim 6, wherein quantizing the parameter to a plurality of states comprises:

comparing the measured distance for each finger to first and second threshold values;

classifying a finger as being in a first state if the measured distance for the finger is below the first threshold value;

classifying the finger as being in a third state if the measured distance for the finger is above the second threshold value; and classifying the finger as being in a second state if the measured distance for the finger is between the first threshold value and the second threshold value.

8. A system as recited in claim 7, wherein the first state comprises a "closed" hand gesture, the second state comprises a "half-open" hand gesture, and the third state comprises an "open" hand gesture.

9. A system as recited in claim 8, wherein classifying a hand gesture comprises comparing the quantized states against a database of predetermined hand gestures.

10. A system as recited in claim 1, wherein the parameter is quantized to a maximum of three states.

11. A system as recited in claim 10, wherein the hand image further comprises:

a thumb four fingers;

wherein a parameter corresponding to the thumb is quantized to two states; and wherein a parameter corresponding to each of the four fingers is quantized to three states.

12. A method for remotely controlling a device using hand gestures, the device having a user interface for visualization on a display, the method comprising:

capturing video of a user's hand with a sensor at a location near said device;

segmenting each hand image in the captured video based on skin color;

extracting a parameter of the segmented hand image;

said parameter relating to one of a plurality of fingers in the hand image;

tracking the parameter in the hand image;

quantizing the parameter for each of the plurality of fingers to a plurality of states by comparing the parameter against one or more thresholds;

classifying a hand gesture based on the quantized states of the one or more fingers;

sending a command to the user interface based on recognition of said hand gesture and tracking of said one or more parameters; and outputting the sent command on the display to operate the device.

13. A method as recited in claim 12, wherein the parameter is quantized to a maximum of three states.

14. A method as recited in claim 13:

wherein the hand image further comprises a thumb four fingers;

wherein a parameter corresponding to the thumb is quantized to two states; and wherein a parameter corresponding to each of the four fingers is quantized to three states.

15. A method as recited in claim 14, wherein extracting the parameter comprises:

obtaining a palm bottom location;

approximating a location of a fingertip of at least one of the plurality of fingers based on said contour; and measuring the distance between the palm bottom location and each of the approximated fingertip locations.

16. A method as recited in claim 15, wherein quantizing the parameter to a plurality of states comprises:

comparing the measured distance for each finger to first and second threshold values; and classifying a finger as being in a first state if the measured distance for the finger is below the first threshold value;

classifying the finger as being in a third state if the measured distance for the finger is above the second threshold value; and classifying the finger as being in a second state if the measured distance for the finger is between the first threshold value and the second threshold value.

17. A method as recited in claim 16, wherein the first state comprises a "closed" hand gesture, the second state comprises a "half-open" hand gesture, and the third state comprises an "open" hand gesture.

18. A method as recited in claim 12, wherein classifying a hand gesture comprises comparing the quantized states against a database of predetermined hand gestures.

19. A gesture recognition system for remote control of a device having a user interface for visualization on a display, comprising:

(a) a sensor for capturing video data of a user's hand at a location near said device;

(b) a processor for processing the captured video data of said hand;

(c) programming executable on said processor for carrying out steps comprising:

segmenting each hand image in the captured video based on skin color;

extracting a parameter of the segmented hand image;
said parameter relating to one of a plurality of fingers in the hand image;
tracking the parameter in the hand image;
quantizing the parameter for each of the plurality of fingers to a maximum of three states by comparing the parameter against one or more thresholds;
classifying a hand gesture based on the quantized states of the one or more fingers; and
operating the device based on recognition of said hand gesture and tracking of a second parameter relating to said hand image;
wherein operating the device comprises sending a command to the user interface based on recognition of said hand gesture and tracking of said second parameter.

20. A system as recited in claim 19, wherein extracting the parameter comprises:
obtaining a palm bottom location;
approximating a location of a fingertip of at least one of the plurality of fingers based on said contour; and
measuring the distance between the palm bottom location and each of the approximated fingertip locations.

\* \* \* \* \*